United States Patent [19]
Noguchi et al.

[11] 3,968,645
[45] July 13, 1976

[54] EXHAUST GAS CLEANING DEVICE FOR INTERNAL COMBUSTION ENGINE

[75] Inventors: Masaaki Noguchi; Masaharu Sumiyoshi; Shinichiro Mizusawa, all of Aichi, Japan

[73] Assignee: Toyota Jidosha Kogyo Kabushiki Kaisha, Aichi, Japan

[22] Filed: Sept. 16, 1974

[21] Appl. No.: 506,450

[30] Foreign Application Priority Data
Oct. 12, 1973 Japan................................ 48-114499

[52] U.S. Cl. .............................. 60/288; 23/288 FA; 60/302
[51] Int. Cl.² .......................................... F01N 3/14
[58] Field of Search ...................... 60/288, 299, 302; 23/288 FA

[56] References Cited
UNITED STATES PATENTS

| | | | |
|---|---|---|---|
| 3,180,712 | 4/1965 | Hamblin | 60/299 |
| 3,236,044 | 2/1966 | Ruge | 60/288 |
| 3,302,394 | 2/1967 | Pahnke | 60/302 |
| 3,783,619 | 1/1974 | Alquist | 60/288 |
| 3,793,830 | 2/1974 | August | 60/288 |
| 3,808,806 | 5/1974 | Nakamura | 60/288 |
| 3,824,788 | 7/1974 | Cole | 60/288 |
| 3,853,483 | 12/1974 | Cross | 60/301 |
| 3,911,676 | 10/1975 | Jensen | 60/302 |

*Primary Examiner*—Douglas Hart
*Attorney, Agent, or Firm*—Stevens, Davis, Miller & Mosher

[57] ABSTRACT

An exhaust gas cleaning device purifier for use in an internal combustion engine of a multicylinder type, comprising a housing to be disposed between exhaust ports of a cylinder head and an exhaust pipe in which housing a catalyst container is enclosed, the catalyst container consisting of two cylinders between which catalyst is filled, a control valve being provided on the catalyst container for passing a part of exhaust gas through the catalyst, thereby a part of the exhaust gas is passed or not through the catalyst in accordance with the conditions of the engine.

12 Claims, 5 Drawing Figures

EXHAUST GAS CLEANING DEVICE FOR INTERNAL COMBUSTION ENGINE

BACKGROUND OF THE INVENTION

This invention relates to an exhaust gas for cleaning by repeated reactions of the exhaust gases from an internal combustion engine, and more specifically, to one for cleaning the exhaust gas by passing the same through a catalyst and thereby effecting re-reaction in the catalyst bed with the heaat retained by the exhaust itself.

Many diversified researches have been done in the technical field of exhaust gases purifying. To effectively operate the exhaust gas cleaning device using the catalyst under varying operative condition, it is necessary to keep the catalyst at a very high temperature so that full catalytic action can be sufficiently attained. This is of particular importance in the cold start of the engine. Even after the warmup, the temperature of the exhaust gas leaving the engine drops so rapidly that a catalyst converter if installed downstream the exhaust line would fail to function satisfactorily because of the lowered exhaust temperature. If the quantity of the catalyst is increased to make up for the loss of its activity, the temperature rise of the catalyst as a whole will be delayed. Thus, in either case, it is often difficult to attain the end with the known devices. Various attempts have been made to overcome these difficulties, but none has proved quite successful.

Moreover, the life of the catalyst is not indefinite. To ensure positive purifying of the exhaust gases, the catalyst must be replaced from time to time. Consideration should, therefore, be given to improvements in the replaceability of the catalyst and in the serviceability of the device. According to the prior art in order to improve the replaceability and serviceability, a catalyst-containing package is disposed between the exhaust manifold and the exhaust pipe. Another attempt was to install such a package on the exhaust manifold. However, the engine room of a vehicle carrying an internal combustion engine therein also accommodates safety and other auxiliary devices, so that the engine room has very little space for location of the catalyst-containing package. For this reason, installation of a catalyst-containing package unit in the engine compartment must be avoided wherever possible.

SUMMARY OF THE INVENTION

It is an object of the present invention to provide an exhaust gas purfier which occupies a minimum space in the engine room of an internal combustion engine vehicle and causes repeated reactions of exhaust gases introduced into contact with a catalyst bed for sufficient cleaning without supplying heat from any external heat source.

Another object of the invention is to provide an exhaust gas purifier which is fully serviceable for occasional replacement of the catalyst and has excellent durability against vibrations. Particularly the purifier mounted in an automotive vehicle is subjected to severe vibrations, and therefore it requires a catalyst bed of highly vibration-proof material and construction.

Still another object of the invention is to provide a purifier of a construction capable of avoiding an extraordinary rise in the temperature of the catalyst bed which would result from a vigorous reaction in the bed and would deteriorate the catalyst itself, and capable of reducing the heat load of the catalyst and protecting the catalyst container against the heat.

DETAILED DESCRIPTION OF THE PREFERRED EMBODIMENTS

Figure 1:
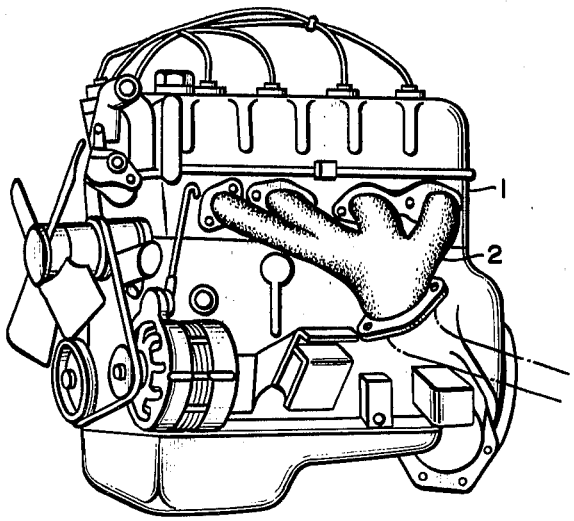
FIG. 1 is a perspective view of an internal combustion engine having a conventional exhaust manifold.
Figure 2:
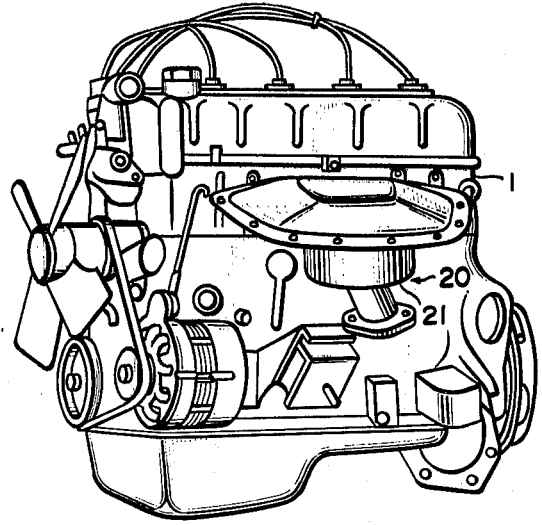
FIG. 2 is a perspective view showing an internal combustion engine having an exhaust gases cleaning device of the invention.
Figure 3:
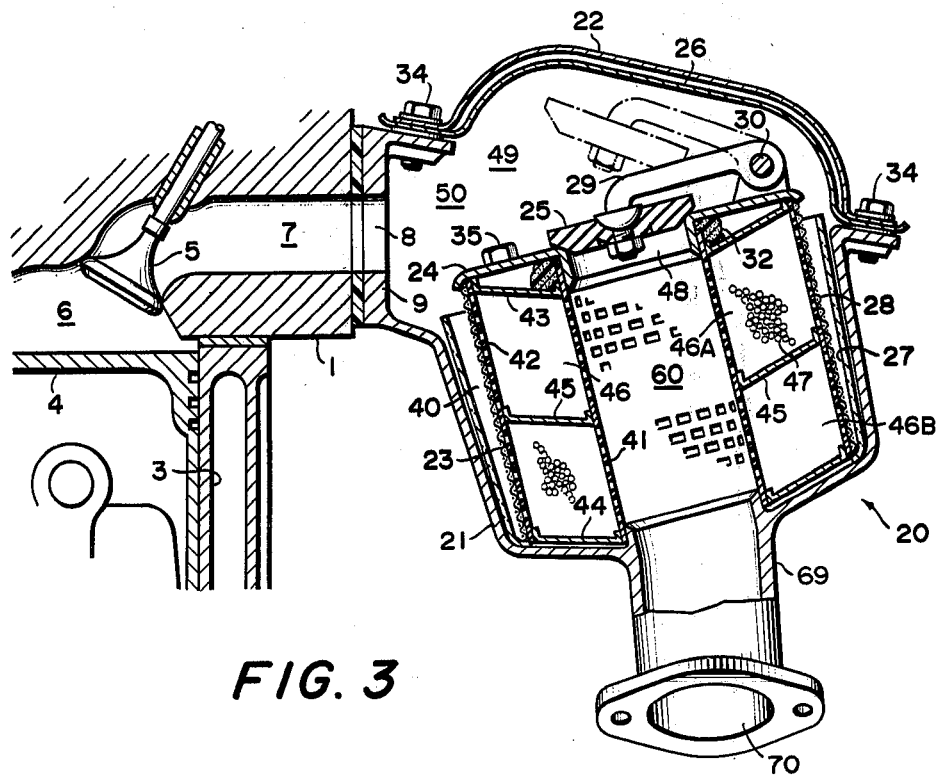
FIG. 3 is a vertical sectional view of an exhaust gas cleaning device embodying the invention.

Referring to the drawings and in particular to FIGS. 1 and 2, there are shown four-cycle multicylinder internal combustion engines of the cross flow type, so called because the intake and exhaust manifolds are separately arranged on the both sides of the cylinder block, as compared with the counter flow type in which the both manifolds are provided together on the same side of the block. In FIGS. 2 and 3 which illustrate such an engine of the cross flow type equipped with the exhaust gas purifier according to the present invention, numeral 1 indicates a cylinder head and numeral 20 designates an exhaust purifier of the invention. The device 20 has passages 8, such as an opening, equal in number to the cylinders of the engine each passage 8 being faced with, and connected to, each exhaust port 7 formed in the cylinder head 1. The connections are substantially the same as those in FIG. 1 showing a conventional exhaust manifold 2.

Burned gases from the combustion chambers 6 of the engine are led through the exhaust ports 7 in the cylinder head 1 to the exhaust gas purifier 20, where they are directed into the catalyst bed laid inside an exhaust manifold 21, and the thoroughly cleaned gas is discharged to an exhaust pipe (not shown).

Figure 4:
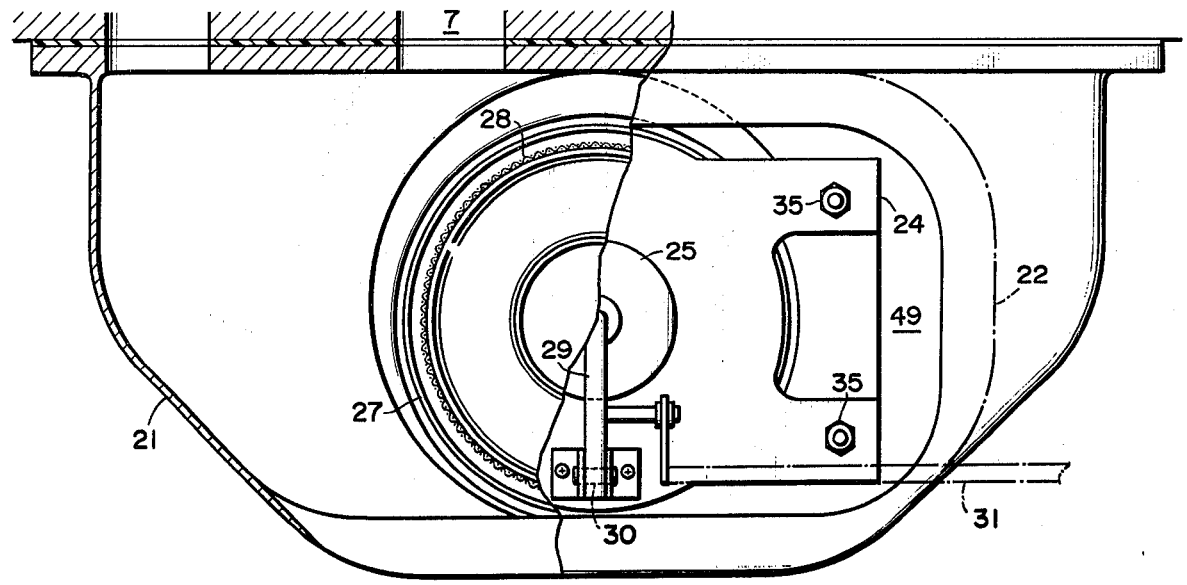
FIG. 4 is a plane view of the device, partly broken away to show the interior construction.

The construction of the exhaust gas purifier 20 according to the invention is shown in FIGS. 3 and 4. Each of the exhaust ports 7 formed in the cylinder head 1 is shown in communication with a combustion chamber 6, which is defined by a cylinder 3, a piston 4, and a cavity formed in the cylinder head 1. The combustion chamber 6 and the exhaust port 7 are bordered by an exhaust valve 5. The exhaust gas manifold has passages 8 formed in an end wall 9, which are equal in number to the cylinders, and is secured to the cylinder head 1 by bolts (not shown) in such a manner that each passage 8 is communicated with each exhaust port 7. The housing 21 serves as a collective exhaust pipe. At the lower end of the exhaust manifold 21 on outlet pipe 70 is provided for conducting the exhaust gas to the exhaust pipe, (not shown).

A chamber 40 accommodating a catalyst container 23 is formed inside the exhaust manifold 21. The catalyst container 23 comprises an inner cylinder 41 formed with a number of small gas-passage holes or small perforations of a suitable diameter, a similarly perforated outer cylinder 42 arranged coaxially with the inner cylinder 41, and annular nonperforated end walls 43 and 44 closing the upper and lower ends of the annular space 46 between the inner and outer cylinders 41 and 42. As shown, the annular end walls 43 and 44 incline downward so that a catalyst 47 which is of a grain-shape and packed in the container 23 is urged by gravity to gather toward the center of the container.

In addition, the catalyst container 23 has a partition wall 45 in its intermediate portion, whereby the space 46 between the inner and outer cylinders 41 and 42 is divided into two compartments 46A and 46B, upper and lower, and the catalyst 47 is accordingly separated into two parts and packed therein respectively. Because of this partitioning, the catalyst 47, even if compacted downward by the mechanical vibration of the container 23 or caused to drop due to its own deterioration, would remain only slightly settled in the upper and lower compartments 46A and 46B. The head space thus formed in each compartment is so small that practically no exhaust gas flows through the gas-passage holes of the inner and outer cylinders 41 and 42 bypassing the catalyst bed. While a single annular partition wall 45 is shown, it should be obvious to those skilled in the art that the number of the wall is not limited to one but may be suitably increased depending on the size of the container 23 and the distribution of the gas-passage holes formed therein.

A valve seat 24 for holding the catalyst container 23 in position and for constituting a valve unit with a valve 25 is secured on the upper end of the catalyst container 23 by bolts 35 threaded to the exhaust manifold 21. The valve unit is provided, as described later, for passing a part of the exhaust gas selectively through the catalyst bed. There be disposed between the valve seat 24 and the upper wall 43 a cushion material 32. The cushion 32 is a netlike structure of a heat resistant material such as a nickel alloy designed to absorb the expansion of the catalyst container 23 by heat and also absorb the vibration of the container to prevent breaking of the catalyst 47.

Around the catalyst container 23 is provided a lead trapper 28 for removing lead included into the exhaust gas, which lead readily deteriorates the catalyst 47. A heat-insulating casing 27 is disposed between the housing 21 and the outer cylinder 42 to attain a heat-retaining effect and to keep the ambient temperature of the purifier 20 from elevating too high.

A center opening 48 is formed in the valve seat 24 concentrically with the inner cylinder 41 to provide a seat for the valve 25. The underside periphery of the valve 25 is beveled for positively closing the opening 48.

The valve 25 is bolted to one end of an arm 29, which is pivotally supported at the other end by a pin 30 adapted to be turned, if necessary, either mechanically or electrically under manual control or through suitable linkage 31 as shown in FIG. 4.

Above the chamber 40, the exhaust manifold 21 has an opening 49 through which the catalyst container 23, lead trapper 28, etc. can be installed or replaced. The opening 49 is closed by a cover 22 detachable with bolts 34, as means closing the housing 21. For increased heat- and sound-insulating effects the cover 22 is double walled structure by comprising an inner cover 26.

The operation of the device with the foregoing construction will now be explained.

Exhaust gas entering the exhaust gas purifier 20 via the exhaust ports 7 flows into the space 50 defined by the cover 26 and the valve seat 24. Since the thermal reaction chamber 50 is close to the combustion chambers 6 and is adequately heat-insulated by the cover 22, the exhaust gases are still maintained at a high temperature in the thermal reaction chamber 50. Consequently, the exhaust gas is cleaned by its own thermal reaction in the thermal reaction chamber 50.

Shortly after a cold starting, or when idling, or when running under small load, the total heat production of the engine is low and the temperature inside the exhaust manifold 21 is very quite high (from 500° to 600°C). Under this condition, the valve 25 keeps the upper opening 48 of the inner cylinder 41 closed. This valve closing operation is carried out by the mechanical and electrical operations of the linkage 31. Under such an operating condition, no thermal reaction takes place in the thermal reaction chamber 50 and the exhaust gases flow into the catalyst container 23 through the small holes or perforations of the outer cylinder 42, repeating a catalytic reaction in contact with the catalyst bed until the gas enters the inner cylinder passage 60 through the holes of the inner cylinder 41. While repeating the thermal reaction with the heat of the exhaust gas itself in this passage 60, the gases are eventually discharged to the exhaust pipe through the outlet 70 formed at the lower end of a connecting portion 69 in the bottom of the exhaust manifold 21.

During high load operation, the exhaust gas temperature in the purifier 20 is as high as about 800°C. Under this condition, if the exhaust gases are supplied to the purifier 20 successively, the catalyst 47 will deteriorate upon exposure to the hot exhaust gases. Therefore, under the high load operation of the engine, the valve 25 is opened by operating the linkage 31 so that a part of exhaust gas may enter the inner cylinder passage 60 without passing through the catalyst 47. The result is that the deterioration of the catalyst 47 is prevented. Thus, a large part of exhaust gas introduced into the thermal reaction chamber 50 flows, while repeating its own thermal reaction, through the inner cylinder passage 60 of low flow resistance and leaves the purifier 20 at the outlet 70. Part of the gas is subjected to a catalytic reaction through contact with the catalyst bed, thereby retaining the heat of the bed and also generating heat for an additional thermal reaction in the inner cylinder passage 60.

As described above, the valve 25 is opened or closed in order to pass a part of the exhaust gas selectively through the catalyst.

As has been described above, according to the present invention, the catalyst bed 47 for cleaning the exhaust gas is accommodated in a chamber 40 formed in the housing of the exhaust gas purifier 20, and therefore a temperature high enough for the thermal and catalytic reactions can be maintained under varying operating conditions of the engine. The purifying effect for the gases is thus accomplished with a high efficiency and in a reliable manner. Moreover, because the catalyst container chamber 40 is integral with the exhaust manifold the purifier is designed to be very compact in construction, permitting full utilization of the space inside the engine room. Further, the catalyst packed in the container can be easily put in position or removed through the opening 49 of exhaust manifold, making the purifier highly serviceable.

With regard to the catalytic action, the provision of the valve that opens or closes according to the operating condition of the engine makes it possible to carry out the catalytic reaction mostly when the exhaust gas temperature is in the range of 500° to 600°C and both the thermal and catalytic reactions when the gas temperature is in the vicinity of 800°C.

Also, in the embodiment of the present invention, the catalyst container is so constructed that its annular bottom is inclined downward and towards the center, and the exhaust gas is admitted from the outside of the container into the outer cylinder and thence into the inner cylinder. Therefore, the catalyst in the container is urged towards the center by its own weight and also by the action of the gas stream. The catalyst grains or the like are thus pressed together and not easily separable from or collidable with one another upon vibration from the outside. Accordingly, the catalyst has few chance of abrasion or attrition.

Figure 5:
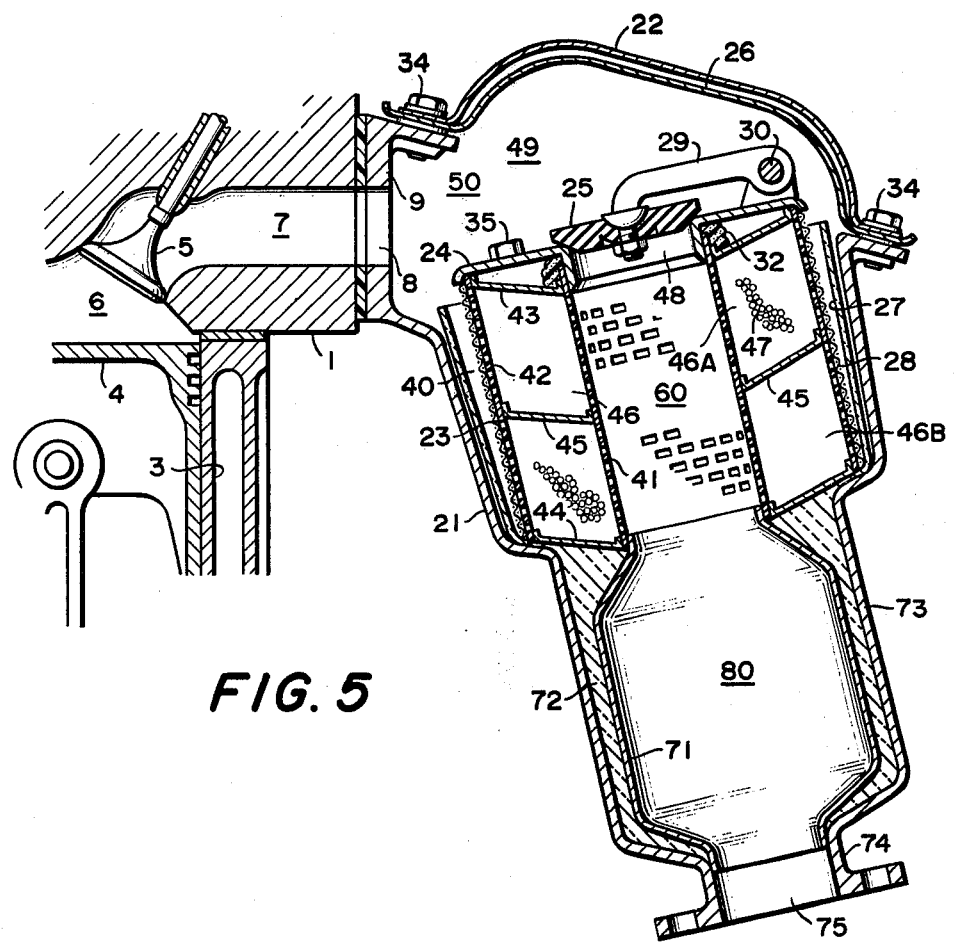
FIG. 5 is a vertical sectional view of another embodiment of the invention.

Another embodiment of the invention will now be explained with reference to FIG. 5 wherein same parts as shown in FIG. 3 are designated by same reference numerals. The exhaust manifold 21 of the exhaust gas purifier 20 has an extended portion 73 at its lower end. Formed at the lower end of the extended portion 73 is a connecting portion 74 for connecting an exhaust pipe (not shown) to the extended portion 73. In the extended portion 73, a casing 71 is disposed, of which the upper end is connected to the lower end of the inner cylinder 41 and the lower end is communicated with an outlet opening 75 of the connecting portion 74. The space between the casing 71 and body is packed with a heat insulating material 72. The casing 71 forms an enlarged chamber 80 connected at its lower end to the portion 74.

With the construction described, the purifier operates in the following way. Hot exhaust gas from the combustion chamber 6 partly cleans itself by a thermal reaction in the thermal reaction chamber 50. If the engine is running at heavy load, the valve 25 will be open as already described and a part of exhaust gas will repeat its thermal reaction in the passage 60 within the inner cylinder 41. At this time, the remaining part of the exhaust gas passes through the space 40 and thence through the catalyst layer 47 for a catalytic reaction, before it enters the passage 60. Because the passage 60 is surrounded by the hot catalyst layer, the exhaust gas admitted to the passage again repeats the thermal reaction for further cleaning. Actually, however, it is difficult to clean the gas completely before it leaves the passage 60, and part of the exhaust gas flows in an unburned or untreated state into the enlarged chamber 80. Since this chamber 80 is wrapped around by the heat insulating material 72 and constantly exposed to the hot exhaust gas, a sufficiently high temperature for the thermal reaction is maintained in the chamber. Therefore, the unburned gas entering the enlarged chamber 80 undergoes an extra thermal reaction for more perfect cleaning of the exhaust.

As stated, the enlarged chamber 80 directly connected to the lower end of the catalyst container chamber 23 can hold the exhaust gases at a high temperature, and the retention time of the exhaust gases in the purifier is prolonged by the provision of the chamber 80 in addition to the space 50 and the passage 60. This naturally enables the exhaust gases to undergo a more perfect thermal reaction. Furthermore, because the catalyst bed and the enlarged chamber are provided integrally with the exhaust manifold, a very efficient exhaust gas purifier is realized.

What is claimed is:

1. An exhaust gas purifier for use in an internal combustion engine having a plurality of exhaust ports arranged horizontally relative to each other, said purifier comprising:

an exhaust manifold connected to said posts for collecting therein exhaust gases generated in said engine;

a catalyst container vertically installed in said exhaust manifold;

said container having inner and outer cylindrical walls and upper and bottom annular end walls, said inner and outer cylindrical walls having perforations thereon, an outer passage defined between said outer cylindrical wall and an inner wall of said exhaust manifold, an inner passage being defined by said inner cylindrical wall therein;

said exhaust manifold and said container being adapted to form a large space so that a thermal reaction of the exhaust gas takes place therein, said inner passage having a normally closed upper end;

catalyst charged to form a catalyst bed within a space defined by said inner and outer cylindrical walls and said upper and bottom end walls therebetween; and an exhaust pipe connected to said container at a bottom opening of said inner passage for discharging exhaust gases to the atmosphere;

the arrangement being such that exhaust gases are introduced from said engine into said large space in which part of the unburned gases of the exhaust gases are burned in the presence of oxygen contained in the exhaust gases by the thermal reaction, and these gases flow through said outer passage and perforations disposed in said outer cylindrical wall into said catalyst bed where catalysis occurs, and thereafter through perforations disposed in said inner cylindrical wall and into said inner passage and then through said inner passage to be discharged through said exhaust pipe to the atmosphere.

2. The exhaust gas purifier of claim 1, wherein said exhaust manifold has a downstream extended portion in which an enlarged chamber is formed, so that still existing unburned gases are burned by thermal reaction while flowing through said chamber, said enlarged chamber being communicated at the upstream side thereof with said inner passage through said bottom opening and at the downstream side thereof with said exhaust pipe.

3. The exhaust gas purifier of claim 2 further comprising a heat insulating material surrounding said extended portion.

4. The exhaust gas purifier of claim 1, wherein a partition annular plate is provided in said container for separating said space into an upper space and a bottom space, both upper and bottom spaces being to be charged with catalyst.

5. The exhaust gas purifier of claim 1, wherein said bottom annular end wall is arranged in such a manner that said bottom wall is inclined downward as it extends from the outer circumference thereof toward the center thereof whereby said exhaust gases flowing into said catalyst bed flow slantwise generally in parallel with said bottom wall and said catalyst is urged to be pressed downward by said flowing exhaust gases.

6. The exhaust gas purifier of claim 5, wherein said upper annular end wall is arranged in such a manner that said upper wall is inclined downward as it goes from the outer circumference thereof toward the center thereof.

7. The exhaust gas purifier of claim 1 further comprising means for securing said container at a predetermined location and a cushion material between said upper annular end wall and said securing means.

8. The exhaust gas purifier of claim 1, including means in said outer passage for trapping lead contained in exhaust gases.

9. The exhaust gas purifier of claim 1 further comprising a cover detachably fitted on said exhaust manifold at an opening disposed therein, so that said container can be installed and removed.

10. The exhaust gas purifier of claim 9, wherein said cover has a double shell structure so that the inside of said exhaust manifold is heat insulated.

11. The exhaust gas purifier of claim 1 further comprising a heat insulating casing in said exhaust manifold, said heat insulating casing being disposed so as to surround said outer wall, said outer passage being defined by said heat insulating casing and said outer wall.

12. An exhaust gas purifier for use in an internal combustion engine having a plurality of exhaust ports arranged horizontally relative to each other, said purifier comprising:

an exhaust manifold connected to said posts for collecting therein exhaust gases generated in said engine;

a catalyst container vertically installed in said exhaust manifold said container having inner and outer cylindrical walls and upper and bottom annular end walls, said inner and outer cylindrical wall having perforations therein, an outer passage defined between said outer cylindrical wall and an inner wall of said exhaust manifold, an inner passage being defined by said inner cylindrical wall therein;

said exhaust manifold and said container being adapted to form a large space so that a thermal reaction of exhaust gas takes place therein, means for closing and opening an upper opening of said inner passage;

catalyst charged to form a catalyst bed within a space defined by said inner and outer cylindrical walls and said upper and bottom end walls therebetween; and an exhaust pipe connected to said container at a bottom opening of said inner passage for discharging exhaust gases to the atmosphere;

the arrangement being such that when said means closes said upper opening exhaust gases introduced into said large space flow through said outer passage and perforations disposed in said outer cylindrical wall into said catalyst bed where catalysis occur, gases flow therefrom through perforations disposed in said inner cylindrical wall into said inner passage and then flow through said exhaust pipe to the atmosphere, and when said means opens said upper opening exhaust gases introduced in said large space flow mainly through said inner passage in which thermal reaction of said exhaust gases occurs thereby purifying said exhaust gases, and then flow through said exhaust pipe to the atmosphere so that very limited catalysis with said catalyst occurs thereby maintaining the temperature of said catalyst within a range of predetermined temperature.

* * * * *